（12）United States Patent
Yang et al.

(10) Patent No.: US 11,950,245 B2
(45) Date of Patent: Apr. 2, 2024

(54) METHOD AND DEVICE FOR CROSS CARRIER SCHEDULING PHYSICAL DOWNLINK SHARED CHANNEL

(71) Applicant: VIVO MOBILE COMMUNICATION CO., LTD., Dongguan (CN)

(72) Inventors: Yu Yang, Dongguan (CN); Peng Sun, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 588 days.

(21) Appl. No.: 17/145,239

(22) Filed: Jan. 8, 2021

(65) Prior Publication Data

US 2021/0136807 A1  May 6, 2021

Related U.S. Application Data (63) Continuation of application No. PCT/CN2019/095019, filed on Jul. 8, 2019.

(30) Foreign Application Priority Data

Jul. 12, 2018  (CN) .......................... 201810762260.0

(51) Int. Cl.
*H04W 72/23* (2023.01)
*H04L 5/00* (2006.01)

(52) U.S. Cl.
CPC .......... *H04W 72/23* (2023.01); *H04L 5/0053* (2013.01)

(58) Field of Classification Search
CPC ..... H04W 72/00; H04W 72/04; H04W 72/12; H04W 72/23; H04W 72/40; H04W 72/50; H04L 5/0053; H04L 5/0035; H04L 1/18
See application file for complete search history.

(56) References Cited

U.S. PATENT DOCUMENTS 9,497,775 B2* 11/2016 Chung ................. H04L 1/1861
2012/0257554 A1* 10/2012 Kim ...................... H04L 5/0055
370/280
2013/0010714 A1*  1/2013 Kim ...................... H04L 1/0038
370/329

(Continued)

FOREIGN PATENT DOCUMENTS

CN         102804675 A      11/2012
CN         103312467 A       9/2013

(Continued)

OTHER PUBLICATIONS

International Search Report issued in corresponding International Application No. PCT/CN2019/095019, dated Oct. 9, 2019, 4 pages.

(Continued)

*Primary Examiner* — Jean A Gelin
(74) *Attorney, Agent, or Firm* — IPX PLLC (57) ABSTRACT

A method and a device for cross carrier scheduling a physical downlink shared channel are provided. The method includes: receiving downlink control information DCI, where the DCI is used to indicate cross carrier scheduling a physical downlink shared channel PDSCH; determining (Continued)

target quasi-colocation QCL information of the cross carrier scheduled PDSCH; and receiving the cross carrier scheduled PDSCH based on the target QCL information.

14 Claims, 4 Drawing Sheets

(56) References Cited

U.S. PATENT DOCUMENTS

| | | | |
|---|---|---|---|
| 2014/0119266 A1* | 5/2014 | Ng | H04L 27/2602 |
| | | | 370/312 |
| 2016/0255648 A1* | 9/2016 | Frenne | H04L 5/001 |
| | | | 370/329 |
| 2016/0337110 A1* | 11/2016 | Yang | H04L 1/1887 |
| 2017/0150480 A1* | 5/2017 | Kim | H04L 67/12 |
| 2017/0257853 A1* | 9/2017 | Park | H04W 4/06 |
| 2017/0318565 A1* | 11/2017 | Golitschek Edler von Elbwart | |
| | | | H04W 72/04 |
| 2019/0045488 A1* | 2/2019 | Park | H04L 5/0048 |
| 2019/0141693 A1* | 5/2019 | Guo | H04W 16/14 |
| 2019/0239093 A1* | 8/2019 | Zhang | H04L 5/001 |
| 2019/0297637 A1* | 9/2019 | Liou | H04W 72/1273 |
| 2019/0297640 A1* | 9/2019 | Liou | H04L 5/001 |
| 2022/0104185 A1* | 3/2022 | Moon | H04L 1/1822 |

FOREIGN PATENT DOCUMENTS

| | | |
|---|---|---|
| CN | 104782067 A | 7/2015 |
| CN | 105578608 A | 5/2016 |
| CN | 106063322 A | 10/2016 |
| WO | 2012162889 A1 | 12/2012 |
| WO | 2018084595 A1 | 5/2018 |
| WO | 2018084676 A1 | 5/2018 |

OTHER PUBLICATIONS

Vivo, "Remaining issues on beam measurement and reporting", 3GPP TSG RAN WG1 Meeting #93 R1-1806044, May 25, 2018, section 2.2.

Search Report issued in related Chinese Application No. 201810762260.0, dated Apr. 27, 2020, 5 pages.

CMCC, "Discussion on remaining issues for beam management", 3GPP TSG RAN WG1 Meeting 90bis R1-1720586, Dec. 1, 2017.

* cited by examiner

METHOD AND DEVICE FOR CROSS CARRIER SCHEDULING PHYSICAL DOWNLINK SHARED CHANNEL

CROSS-REFERENCE TO RELATED APPLICATIONS

This application a bypass continuation of PCT Application No. PCT/CN2019/095019 filed Jul. 8, 2019, which claims priority to Chinese Patent Application No. 201810762260.0 filed in China on Jul. 12, 2018, both of which are incorporated herein by reference in their entireties.

TECHNICAL FIELD

This disclosure relates to the communications field, and in particular, to a method and a device for cross carrier scheduling a physical downlink shared channel.

BACKGROUND

The fifth generation (fifth Generation, 5G) mobile communications system new radio (New Radio, NR) has introduced a massive antenna technology, which can better support a multi-user multiple-input multiple-output (Multi-User Multiple-Input Multiple-Output, MU-MIMO) antenna technology. In order to reduce device cost and complexity of baseband processing caused by massive antenna arrays, a hybrid digital-analog beamforming technology is used to roughly match transmitted signals with channels.

However, in a process of cross carrier scheduling based on the hybrid digital-analog beamforming technology, there still lacks a corresponding scheme for cross carrier scheduling a physical downlink shared channel (Physical Downlink Shared Channel, PDSCH) in the related technologies.

SUMMARY

An objective of embodiments of this disclosure is to provide a method and a device for cross carrier scheduling a physical downlink shared channel, so that cross carrier scheduling a physical downlink shared channel can be effectively implemented.

According to a first aspect, an embodiment of this disclosure provides a method for cross carrier scheduling a physical downlink shared channel, applied to a terminal device, where the method includes: receiving DCI, where the DCI is used to indicate cross carrier scheduling a PDSCH; determining target QCL information of the cross carrier scheduled PDSCH; and receiving the cross carrier scheduled PDSCH based on the target QCL information.

According to a second aspect, an embodiment of this disclosure further provides a method for cross carrier scheduling a physical downlink shared channel, applied to a network-side device, where the method includes: sending DCI, where the DCI is used to indicate cross carrier scheduling a PDSCH; determining target QCL information of the cross carrier scheduled PDSCH; and sending the cross carrier scheduled PDSCH based on the target QCL information.

According to a third aspect, an embodiment of this disclosure further provides a terminal device, including: a first receiving module, configured to receive DCI, where the DCI is used to indicate cross carrier scheduling a PDSCH; a determining module, configured to determine target QCL information of the cross carrier scheduled PDSCH; and a second receiving module, configured to receive the cross carrier scheduled PDSCH based on the target QCL information.

According to a fourth aspect, an embodiment of this disclosure further provides a terminal device, including a processor, a memory, and a computer program stored in the memory and capable of running on the processor, where when the computer program is executed by the processor, the steps of the method for cross carrier scheduling a physical downlink shared channel according to the first aspect are implemented.

According to a fifth aspect, an embodiment of this disclosure further provides a computer-readable storage medium, where the computer-readable storage medium stores a computer program, and when the computer program is executed by a processor, the steps of the method for cross carrier scheduling a physical downlink shared channel according to the first aspect are implemented.

According to a sixth aspect, an embodiment of this disclosure further provides a network-side device, including: a first sending module, configured to send DCI, where the DCI is used to indicate cross carrier scheduling a PDSCH; a determining module, configured to determine target QCL information of the cross carrier scheduled PDSCH; and a second sending module, configured to send the cross carrier scheduled PDSCH based on the target QCL information.

According to a seventh aspect, an embodiment of this disclosure further provides a network-side device, including a processor, a memory, and a computer program stored in the memory and capable of running on the processor, where when the computer program is executed by the processor, the steps of the method for cross carrier scheduling a physical downlink shared channel according to the second aspect are implemented.

According to an eighth aspect, an embodiment of this disclosure further provides a computer-readable storage medium, where the computer-readable storage medium stores a computer program, and when the computer program is executed by a processor, the steps of the method for cross carrier scheduling a physical downlink shared channel according to the second aspect are implemented.

In the embodiments of this disclosure, a terminal device receives DCI used to indicate cross carrier scheduling a PDSCH, determines target QCL information of the cross carrier scheduled PDSCH, and then receives the cross carrier scheduled PDSCH based on the target QCL information, so that cross carrier scheduling the PDSCH can be effectively implemented.

BRIEF DESCRIPTION OF DRAWINGS

The drawings described herein are intended for a further understanding of this disclosure and constitute a part of this disclosure. Example embodiments of this disclosure and descriptions thereof are intended to explain this disclosure, and do not constitute any inappropriate limitation on this disclosure. In the drawings.

DETAILED DESCRIPTION

The following clearly and describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

Figure 1:
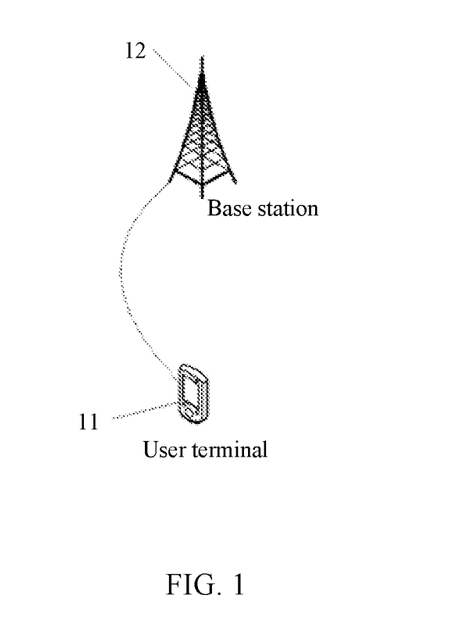
FIG. 1 is a schematic diagram of a network architecture according to an embodiment of this disclosure.

FIG. 1 is a schematic diagram of a network architecture according to an embodiment of this disclosure. As shown in FIG. 1, the network architecture includes a user terminal 11 and a base station 12. The user terminal 11 may be user equipment (User Equipment, UE), for example, may be a terminal-side device such as a mobile phone, a tablet computer (Tablet Personal Computer), a laptop computer (Laptop Computer), a personal digital assistant (personal digital assistant, PDA), a mobile Internet device (Mobile Internet Device, MID), or a wearable device (Wearable Device). It should be noted that the user terminal 11 is not limited to any specific type in this embodiment of this disclosure. The base station 12 may be a base station (for example, a gNB or a 5G NR NB) in 5G or a later version, or a base station in another communications system, or referred to as a NodeB. It should be noted that only a 5G base station is used as an example in this embodiment of this disclosure, but the base station 12 is not limited to any specific type.

It should be noted that specific functions of the terminal device 11 and the base station 12 are described in detail by using the following embodiments.

Figure 2:
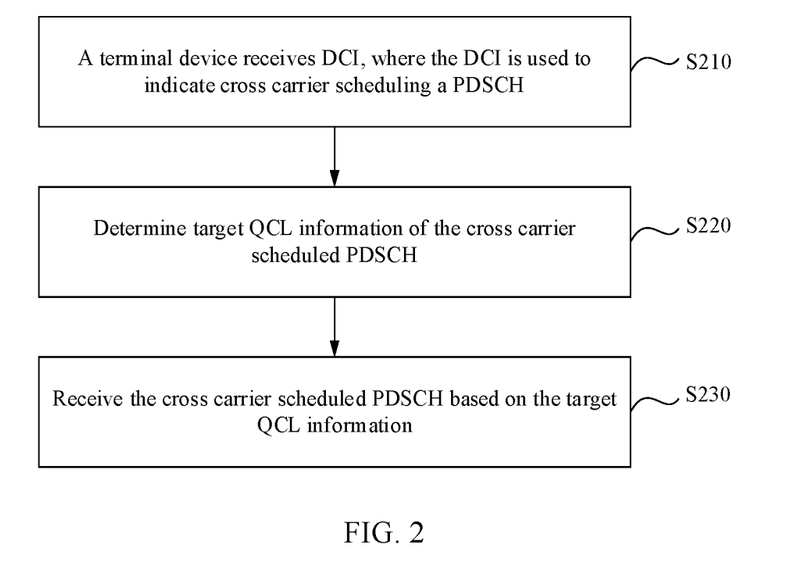
FIG. 2 is a schematic flowchart of a method for cross carrier scheduling a physical downlink shared channel according to an embodiment of this disclosure.

FIG. 2 is a schematic flowchart of a method for cross carrier scheduling a physical downlink shared channel according to an embodiment of this disclosure. The method is applied to a terminal device, and may be as shown in the following.

Step 210. A terminal device receives downlink control information (Downlink Control Information, DCI), where the DCI is used to indicate cross carrier scheduling a physical downlink shared channel (Physical Downlink Shared Channel, PDSCH).

Step 220. Determine target quasi-colocation (Quasi-colocation, QCL) information of the cross carrier scheduled PDSCH.

Step 230. Receive the cross carrier scheduled PDSCH based on the target QCL information.

When a network-side device needs to cross carrier schedule the PDSCH, the network-side device sends the DCI used to indicate cross carrier scheduling a PDSCH to the terminal device. After receiving the DCI, the terminal device firstly determines the target QCL information of the cross carrier scheduled PDSCH by the network-side device, and then receives the cross carrier scheduled PDSCH by the network-side device based on the determined target QCL information.

In this embodiment of this disclosure, the target QCL information includes at least a spatial receiving parameter QCL-TypeD.

Based on the spatial receiving parameter QCL-TypeD included in the target QCL information, the terminal device can determine on which transmission beam the cross carrier scheduled PDSCH by the network-side device is to be received.

It should be noted that, in addition to the spatial receiving parameter QCL-TypeD, other parameters can be included in the target QCL information, such as QCL-TypeA, QCL-TypeB, and QCL-TypeC, which are not specifically limited herein.

The terminal device can determine the target QCL information of the cross carrier scheduled PDSCH in at least five manners.

Manner 1:

In this embodiment of this disclosure, a control resource set CORESET corresponding to a physical downlink control channel (Physical Downlink Control Channel, PDCCH) carrying the DCI is configured with a target higher layer parameter tci-PresentInDCI, and the target higher layer parameter tci-PresentInDCI is set as enabled.

For a scenario where a PDSCH is cross carrier scheduled, the network-side device is not allowed to skip configuring a target higher layer parameter tci-PresentInDCI of a CORESET corresponding to a PDCCH, and the configured target higher layer parameter tci-PresentInDCI is not allowed to be set as disabled; or, the network-side device is not allowed to use a PDCCH corresponding to a CORESET not configured with a target higher layer parameter tci-PresentInDCI, or a PDCCH corresponding to a CORESET configured with a target higher layer parameter tci-PresentInDCI that is set as disabled to carry DCI.

In other words, the CORESET corresponding to the PDCCH carrying the DCI received by the terminal device is always configured with the target higher layer parameter tci-PresentInDCI, and the configured target higher layer parameter tci-PresentInDCI is set as enabled. For example, what the terminal device has received is DCI format 1_1, and the DCI format 1_1 includes an N-bit TCI field.

In this embodiment of this disclosure, determining target QCL information of the cross carrier scheduled PDSCH includes:

determining a time offset between a receiving moment of the DCI and a receiving moment of the cross carrier scheduled PDSCH;

if the time offset is less than a preset threshold, determining the target QCL information based on predetermined target transmission configuration indication (Transmission Configuration Indication, TCI) state information; and if the time offset is greater than or equal to the preset threshold, determining the target QCL information based on TCI state information in the DCI.

In practical application, the network-side device can add an N-bit TCI indication field into the DCI used to indicate cross carrier scheduling the PDSCH, and indicate, to the terminal device the target QCL information of the cross carrier scheduled PDSCH based on the TCI state information in the N-bit TCI field.

For example, after receiving the DCI, the terminal device decodes the DCI to determine the TCI state information in the N-bit TCI field in the DCI, and then determines the target QCL information as that a demodulation reference signal (Demodulation Reference Signal, DMRS) port of the cross carrier scheduled PDSCH is at least in spatial quasi-colocation with an RS in a reference signal set (Reference Signal Set, RS set) indicated by the TCI state information in the N-bit TCI field in the DCI, that is, the cross carrier scheduled PDSCH and the RS have a same spatial domain transmission parameter (for example, may be transmitted on a same beam).

However, because it takes time for the terminal device to decode the DCI and adjust the spatial receiving parameters, the terminal device firstly reports its own capability parameters to the network-side device, so that the network-side device determines the preset threshold based on the capability parameters reported by the terminal device.

It should be noted that the preset threshold is a minimum time required for the terminal device to decode the DCI and adjust the spatial receiving parameters. The preset threshold is called Threshold-Sched-Offset in the existing physical layer protocol and time Duration For QCL in the higher layer protocol.

a. When the time offset between the receiving moment at which the terminal device receives the DCI and the receiving moment at which the terminal device receives the cross carrier scheduled PDSCH is less than the preset threshold, it indicates that when the terminal device is required to receive the cross carrier scheduled PDSCH, the terminal device has not decoded the DCI, and/or has not adjusted the spatial receiving parameters, and cannot determine the target QCL information based on the TCI state information in the DCI. In this case, the terminal device determines the target QCL information of the cross carrier scheduled PDSCH based on predetermined target TCI state information.

In this embodiment of this disclosure, the target TCI state information includes at least one of the following:

TCI state information of a CORESET with a target identifier ID on a bandwidth part (Bandwidth Part, BWP) in an activated state in a serving cell corresponding to the terminal device; and TCI state information of a CORESET corresponding to a PDCCH carrying the DCI.

The CORESET with the target ID on the BWP is a CORESET with a lowest ID on the BWP.

It should be noted that in addition to the foregoing several types of TCI state information, the target TCI state information may include other TCI state information, which is not specifically limited herein.

For example, when the time offset between the receiving moment at which the terminal device receives the DCI and the receiving moment at which the terminal device receives the cross carrier scheduled PDSCH is less than the preset threshold, the terminal device determines the target QCL information of the cross carrier scheduled PDSCH based on the TCI state information of the CORESET with the lowest ID on the BWP in the activated state in the serving cell corresponding to the terminal device.

b. When the time offset between the receiving moment at which the terminal device receives the DCI and the receiving moment at which the terminal device receives the cross carrier scheduled PDSCH is greater than or equal to the preset threshold, it indicates that when the terminal device is required to receive the cross carrier scheduled PDSCH, the terminal device has already decoded the DCI and adjusted the spatial receiving parameters, and in this case, can determine the target QCL information of the cross carrier scheduled PDSCH based on the TCI state information in the DCI.

According to the foregoing manner 1 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

Manner 2:

In this embodiment of this disclosure, determining target QCL information of the cross carrier scheduled PDSCH includes:

determining the target QCL information based on predetermined target TCI state information.

After the terminal device receives the DCI, no matter whether a time offset between a receiving moment at which the DCI is received and a receiving moment at which the cross carrier scheduled PDSCH is received is less than a preset threshold, the terminal device determines the target QCL information of the cross carrier scheduled PDSCH based on the predetermined target TCI state information.

For example, after the terminal device receives the DCI, no matter whether the time offset between the receiving moment at which the terminal device receives the DCI and the receiving moment at which the terminal device receives the cross carrier scheduled PDSCH is less than the preset threshold, the terminal device determines the target QCL information of the cross carrier scheduled PDSCH based on TCI state information of a CORESET with a target ID on a BWP in an activated state in a serving cell corresponding to the terminal device.

According to the foregoing manner 2 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

Manner 3:

In this embodiment of this disclosure, determining target QCL information of the cross carrier scheduled PDSCH includes:

determining a time offset between a receiving moment of the DCI and a receiving moment of the cross carrier scheduled PDSCH;

if the time offset is less than a preset threshold, determining the target QCL information based on predetermined first target TCI state information;

if the time offset is greater than or equal to the preset threshold, and a CORESET corresponding to a PDCCH carrying the DCI is not configured with a target higher layer parameter tci-PresentInDCI, determining the target QCL information based on predetermined second target TCI state information; and if the time offset is greater than or equal to the preset threshold, the CORESET corresponding to the PDCCH carrying the DCI is configured with a target higher layer parameter tci-PresentInDCI, and the target higher layer parameter tci-PresentInDCI is set as enabled, determining the target QCL information based on TCI state information in the DCI; where the first target TCI state information and the second target TCI state information are same or different target TCI state information.

(1) When the time offset between the receiving moment at which the terminal device receives the DCI and the receiving moment at which the terminal device receives the cross carrier scheduled PDSCH is less than the preset threshold, no matter whether an N-bit TCI field is included in the DCI, when the terminal device is required to receive the cross carrier scheduled PDSCH, the terminal device has not decoded the DCI, and/or has not adjusted spatial receiving parameters, and cannot determine the target QCL information based on TCI state information in the N-bit TCI field in the DCI. In this case, the terminal device determines the target QCL information of the cross carrier scheduled PDSCH based on the predetermined first target TCI state information.

For example, when the time offset between the receiving moment at which the terminal device receives the DCI and the receiving moment at which the terminal device receives the cross carrier scheduled PDSCH is less than the preset threshold, the terminal device determines the target QCL information of the cross carrier scheduled PDSCH based on TCI state information of a CORESET with a lowest ID on a BWP in an activated state in a serving cell corresponding to the terminal device.

(2) When the time offset between the receiving moment at which the terminal device receives the DCI and the receiving moment at which the terminal device receives the cross carrier scheduled PDSCH is greater than or equal to the preset threshold, it indicates that when the terminal device is required to receive the cross carrier scheduled PDSCH, the terminal device has already decoded the DCI and has adjusted the spatial receiving parameters. In this case, the target QCL information of the cross carrier scheduled PDSCH needs to be determined based on whether the N-bit TCI field is included in the DCI, that is, whether the CORESET corresponding to the PDCCH carrying the DCI is configured with the higher layer parameter tci-PresentInDCI, and whether the target higher layer parameter tci-PresentInDCI is set as enabled or disabled.

a. When the time offset between the receiving moment at which the terminal device receives the DCI and the receiving moment at which the terminal device receives the cross carrier scheduled PDSCH is greater than or equal to the preset threshold, and when the CORESET corresponding to the PDCCH carrying the DCI is not configured with the target higher layer parameter tci-PresentInDCI, it indicates that an N-bit TCI field is not included in the DCI or the N-bit TCI field is included in the DCI but is invalid, and the target QCL information cannot be determined based on the TCI state information in the DCI. In this case, the terminal device determines the target QCL information of the cross carrier scheduled PDSCH based on the predetermined second target TCI state information.

It should be noted that the CORESET corresponding to the PDCCH carrying the DCI being not configured with the target higher layer parameter tci-PresentInDCI includes two cases: (I) The CORESET corresponding to the PDCCH carrying the DCI is not configured with the target higher layer parameter tci-PresentInDCI. For example, the terminal device receives DCI format 1_0, and an N-bit TCI field is not included in the DCI format 1_0; or the terminal device receives DCI format 1_1, and an N-bit TCI field is not included in the DCI format 1_1. (II) The CORESET corresponding to the PDCCH carrying the DCI is configured with the target higher layer parameter tci-PresentInDCI, but the target higher layer parameter tci-PresentInDCI is set as disabled. For example, the terminal device receives DCI format 1_1, an N-bit TCI field is included in the DCI format 1_1, but the target higher layer parameter tci-PresentInDCI configured for the CORESET corresponding to the PDCCH carrying the DCI is set as disabled.

For example, when the time offset between the receiving moment at which the terminal device receives the DCI and the receiving moment at which the terminal device receives the cross carrier scheduled PDSCH is greater than or equal to the preset threshold, and the CORESET corresponding to the PDCCH carrying the DCI is not configured with the target higher layer parameter tci-PresentInDCI (for example, the terminal device receives DCI format 1_0, and an N-bit TCI field is not included in the DCI format 1_0; or the terminal device receives DCI format 1_1, and an N-bit TCI field is not included in the DCI format 1_1), the terminal device determines the target QCL information of the cross carrier scheduled PDSCH based on the TCI state information of the CORESET corresponding to the PDCCH carrying the DCI; or when the time offset between the receiving moment at which the terminal device receives the DCI and the receiving moment at which the terminal device receives the cross carrier scheduled PDSCH is greater than or equal to the preset threshold, and the CORESET corresponding to the PDCCH carrying the DCI is configured with the target higher layer parameter tci-PresentInDCI (for example, the terminal device receives DCI format 1_1, and an N-bit TCI field is included in the DCI format 1_1), but the target higher layer parameter tci-PresentInDCI is set as disabled, the terminal device determines the target QCL information of the cross carrier scheduled PDSCH based on the TCI state information of the CORESET corresponding to the PDCCH carrying the DCI.

b. When the time offset between the receiving moment at which the terminal device receives the DCI and the receiving moment at which the terminal device receives the cross carrier scheduled PDSCH is greater than or equal to the preset threshold, the CORESET corresponding to the PDCCH carrying the DCI is configured with the target higher layer parameter tci-PresentInDCI, and the target higher layer parameter tci-PresentInDCI is set as enabled, it indicates that an N-bit TCI field is included in the DCI, and the N-bit TCI field is valid. In this case, the terminal device determines the target QCL information of the cross carrier scheduled PDSCH based on the TCI state information in the DCI.

According to the foregoing manner 3 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

Manner 4:

In this embodiment of this disclosure, determining target QCL information of the cross carrier scheduled PDSCH includes:

receiving higher layer signaling, where the higher layer signaling is used to configure or indicate the target QCL information.

The higher layer signaling includes at least one of the following:

radio resource control (Radio Resource Control, RRC) signaling and media access control control element (Medium Access Control Control Element, MAC CE) signaling.

The target QCL information of the cross carrier scheduled PDSCH is determined based on content pre-configured by the network-side device, or predetermined by the network-side device and the terminal device.

For the target QCL information pre-configured by the network-side device, the network-side device indicates the target QCL information to the terminal device through higher layer signaling.

It should be noted that, in addition to the RRC signaling or MAC CE signaling, the higher layer signaling may be other higher layer signaling, which is not specifically limited herein.

The content pre-configured by the network-side device, or predetermined by the network-side device and the terminal device may be: QCL information of a particular carrier (serving cell), a particular BWP, a particular channel, or an RS.

That is, after receiving higher layer signaling, the terminal device may determine, based on configuration information carried by the higher layer signaling, or the content predetermined by the network-side device and the terminal device, that the pre-configured or predetermined particular carrier (serving cell), particular BWP, particular channel, or RS is at least in spatial quasi-colocation with the cross carrier scheduled PDSCH.

According to the foregoing manner 4 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

Manner 5:

In this embodiment of this disclosure, determining target QCL information of the cross carrier scheduled PDSCH includes:

if a PDCCH carrying the DCI is in a first frequency band, determining the target QCL information based on predetermined first target TCI state information, where the first frequency band is a frequency band below 6 GHz; and if the PDCCH carrying the DCI is in a second frequency band, determining the target QCL information based on predetermined second target TCI state information, where the second frequency band is a frequency band above 6 GHz; and the first target TCI state information and the second target TCI state information are different target TCI state information.

The terminal device may distinguish, based on whether the PDCCH carrying the DCI is in the first frequency band (a frequency band below 6 GHz) or in the second frequency band (a frequency band above 6 GHz), different manners of determining the target QCL information of the cross carrier scheduled PDSCH.

(1) When the PDCCH carrying the DCI is in the first frequency band, no matter whether the time offset between the receiving moment at which the terminal device receives the DCI and the receiving moment at which the terminal device receives the cross carrier scheduled PDSCH is less than a preset threshold, the terminal device determines the target QCL information of the cross carrier scheduled PDSCH based on the first target TCI state information (for example, TCI state information of a CORESET with a lowest ID on a BWP in an activated state in a serving cell corresponding to the terminal device).

(2) When the PDCCH carrying the DCI is in the second frequency band, the target QCL information can be determined based on the predetermined second target TCI state information in at least the following three manners.

a. When the PDCCH carrying the DCI is in the second frequency band, and the time offset between the receiving moment at which the terminal device receives the DCI and the receiving moment at which the terminal device receives the cross carrier scheduled PDSCH is less than the preset threshold, the terminal device determines the target QCL information of the cross carrier scheduled PDSCH based on the second target TCI state information (for example, the TCI state information of the CORESET with the lowest ID on the BWP in the activated state in the serving cell corresponding to the terminal device); or when the PDCCH carrying the DCI is in the second frequency band, and the time offset between the receiving moment at which the terminal device receives the DCI and the receiving moment at which the terminal device receives the cross carrier scheduled PDSCH is greater than or equal to the preset threshold, the terminal device determines the target QCL information of the cross carrier scheduled PDSCH based on the second target TCI state information (for example, the TCI state information of the CORESET corresponding to the PDCCH carrying the DCI); or when the PDCCH carrying the DCI is in the second frequency band, and the time offset between the receiving moment at which the terminal device receives the DCI and the receiving moment at which the terminal device receives the cross carrier scheduled PDSCH is greater than or equal to the preset threshold, the terminal device determines the target QCL information of the cross carrier scheduled PDSCH based on the second target TCI state information (for example, the TCI state information in the DCI).

b. When the PDCCH carrying the DCI is in the second frequency band, no matter whether the time offset between the receiving moment at which the terminal device receives the DCI and the receiving moment at which the terminal device receives the cross carrier scheduled PDSCH is less than the preset threshold, the terminal device determines the target QCL information of the cross carrier scheduled PDSCH based on the second target TCI state information (for example, the TCI state information of the CORESET corresponding to the PDCCH carrying the DCI).

According to the foregoing manner 5 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

In the technical solutions recorded in the embodiments of this disclosure, a terminal device receives DCI used to indicate cross carrier scheduling a PDSCH, determines target QCL information of the cross carrier scheduled PDSCH, and then receives the cross carrier scheduled PDSCH based on the target QCL information, so that cross carrier scheduling the PDSCH can be effectively implemented.

Figure 3:
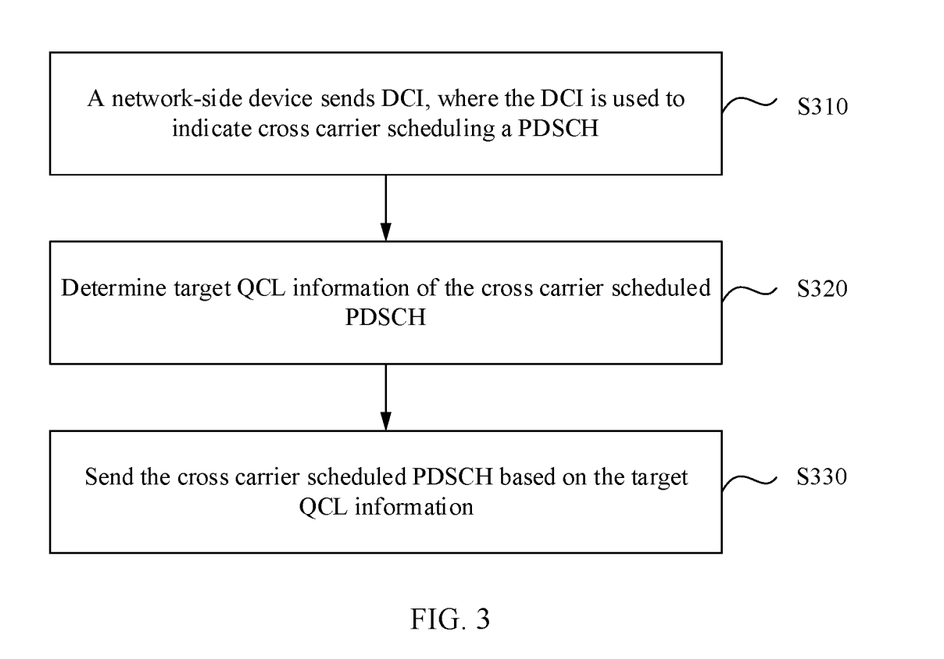
FIG. 3 is another schematic flowchart of a method for cross carrier scheduling a physical downlink shared channel according to an embodiment of this disclosure.

FIG. 3 is another schematic flowchart of a method for cross carrier scheduling a physical downlink shared channel according to an embodiment of this disclosure. The method is applied to a network-side device, and may be as shown in the following.

Step 310. A network-side device sends DCI, where the DCI is used to indicate cross carrier scheduling a PDSCH.

Step 320. Determine target QCL information of the cross carrier scheduled PDSCH.

Step 330. Send the cross carrier scheduled PDSCH based on the target QCL information.

When the network-side device needs to cross carrier schedule the PDSCH, the network-side device sends the DCI used to indicate cross carrier scheduling a PDSCH to a terminal device.

The network-side device determines the target QCL information of the cross carrier scheduled PDSCH, and then sends the cross carrier scheduled PDSCH to the terminal device based on the determined target QCL information.

In this embodiment of this disclosure, the target QCL information includes at least a spatial receiving parameter QCL-TypeD.

Based on the spatial receiving parameter QCL-TypeD included in the target QCL information, the network-side device can determine on which transmission beam the cross carrier scheduled PDSCH is to be sent.

It should be noted that, in addition to the spatial receiving parameter QCL-TypeD, other parameters can be included in the target QCL information, such as QCL-TypeA, QCL-TypeB, and QCL-TypeC, which are not specifically limited herein.

The network-side device can determine the target QCL information of the cross carrier scheduled PDSCH in at least five manners.

Manner 1:

In this embodiment of this disclosure, a CORESET corresponding to a PDCCH carrying the DCI is configured with a target higher layer parameter tci-PresentInDCI, and the target higher layer parameter tci-PresentInDCI is set as enabled.

For a scenario where a PDSCH is cross carrier scheduled, the network-side device is not allowed to skip configuring a target higher layer parameter tci-PresentInDCI of a CORESET corresponding to a PDCCH, and the configured target higher layer parameter tci-PresentInDCI is not allowed to be set as disabled; or, the network-side device is not allowed to use a PDCCH corresponding to a CORESET not configured with a target higher layer parameter tci-PresentInDCI, or a PDCCH corresponding to a CORESET configured with a target higher layer parameter tci-PresentInDCI that is set as disabled to carry the DCI.

In other words, the CORESET corresponding to the PDCCH carrying the DCI is always configured with the target higher layer parameter tci-PresentInDCI, and the configured target higher layer parameter tci-PresentInDCI is set as enabled. For example, the network-side device sends DCI format 1_1 to the terminal device, and an N-bit TCI field is included in the DCI format 1_1.

In this embodiment of this disclosure, determining target QCL information of the cross carrier scheduled PDSCH includes:
 determining a time offset between a sending moment of the DCI and a sending moment of the cross carrier scheduled PDSCH;
 if the time offset is less than a preset threshold, determining the target QCL information based on predetermined target TCI state information; and
 if the time offset is greater than or equal to the preset threshold, determining the target QCL information based on TCI state information in the DCI.

a. When the time offset between the sending moment at which the network-side device sends the DCI and the sending moment at which the network-side device sends the cross carrier scheduled PDSCH is less than a preset threshold, it indicates that when the terminal device is required to receive the cross carrier scheduled PDSCH, the terminal device has not decoded the DCI, and/or has not adjusted spatial receiving parameters, and the target QCL information cannot be determined based on the TCI state information in the DCI. In this case, the network-side device determines the target QCL information of the cross carrier scheduled PDSCH based on the predetermined target TCI state information.

In this embodiment of this disclosure, the target TCI state information includes at least one of the following:
 TCI state information of a CORESET with a target ID on a BWP in an activated state in a serving cell corresponding to the terminal device; and
 TCI state information of a CORESET corresponding to a PDCCH carrying the DCI.

The CORESET with the target ID on the BWP is a CORESET with a lowest ID on the BWP.

It should be noted that in addition to the foregoing several types of TCI state information, the target TCI state information may include other TCI state information, which is not specifically limited herein.

For example, when the time offset between the sending moment at which the network-side device sends the DCI and the sending moment at which the network-side device sends the cross carrier scheduled PDSCH is less than the preset threshold, the network-side device determines the target QCL information of the cross carrier scheduled PDSCH based on the TCI state information of the CORESET with the lowest ID on the BWP in the activated state in the serving cell corresponding to the terminal device.

b. When the time offset between the sending moment at which the network-side device sends the DCI and the sending moment at which the network-side device sends the cross carrier scheduled PDSCH is greater than or equal to the preset threshold, it indicates that when the terminal device is required to receive the cross carrier scheduled PDSCH, the terminal device has already decoded the DCI and adjusted the spatial receiving parameters, and in this case, the target QCL information of the cross carrier scheduled PDSCH can be determined based on the TCI state information in the DCI.

According to the foregoing manner 1 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

Manner 2:

In this embodiment of this disclosure, determining target QCL information of the cross carrier scheduled PDSCH includes:
 determining the target QCL information based on predetermined target TCI state information.

No matter whether a time offset between a sending moment at which the DCI is sent and a sending moment at which the cross carrier scheduled PDSCH is sent is less than a preset threshold, the network-side device determines the target QCL information of the cross carrier scheduled PDSCH based on the predetermined target TCI state information.

For example, no matter whether the time offset between the sending moment at which the DCI is sent and the sending moment at which the cross carrier scheduled PDSCH is sent is less than the preset threshold, the network-side device determines the target QCL information of the cross carrier scheduled PDSCH based on TCI state information of a CORESET with a target ID on a BWP in an activated state in a serving cell corresponding to the terminal device.

According to the foregoing manner 2 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

Manner 3:

In this embodiment of this disclosure, determining target QCL information of the cross carrier scheduled PDSCH includes:

determining a time offset between a sending moment of the DCI and a sending moment of the cross carrier scheduled PDSCH;

if the time offset is less than a preset threshold, determining the target QCL information based on predetermined first target TCI state information;

if the time offset is greater than or equal to the preset threshold, and a CORESET corresponding to a PDCCH carrying the DCI is not configured with a target higher layer parameter tci-PresentInDCI, determining the target QCL information based on predetermined second target TCI state information; and if the time offset is greater than or equal to the preset threshold, the CORESET corresponding to the PDCCH carrying the DCI is configured with the target higher layer parameter tci-PresentInDCI, and the target higher layer parameter tci-PresentInDCI is set as enabled, determining the target QCL information based on TCI state information in the DCI; where the first target TCI state information and the second target TCI state information are same or different target TCI state information.

(1) When the time offset between the sending moment at which the network-side device sends the DCI and the sending moment at which the network-side device sends the cross carrier scheduled PDSCH is less than the preset threshold, no matter whether an N-bit TCI field is included in the DCI, when the terminal device is required to receive the cross carrier scheduled PDSCH, the terminal device has not decoded the DCI, and/or has not adjusted spatial receiving parameters, and the target QCL information cannot be determined based on TCI state information in the N-bit TCI field in the DCI. In this case, the network-side device determines the target QCL information of the cross carrier scheduled PDSCH based on the predetermined first target TCI state information.

For example, when the time offset between the sending moment at which the network-side device sends the DCI and the sending moment at which the network-side device sends the cross carrier scheduled PDSCH is less than the preset threshold, the network-side device determines the target QCL information of the cross carrier scheduled PDSCH based on TCI state information of a CORESET with a lowest ID on a BWP in an activated state in a serving cell corresponding to the terminal device.

(2) When the time offset between the sending moment at which the network-side device sends the DCI and the sending moment at which the network-side device sends the cross carrier scheduled PDSCH is greater than or equal to the preset threshold, it indicates that when the terminal device is required to receive the cross carrier scheduled PDSCH, the terminal device has already decoded the DCI and has adjusted the spatial receiving parameters. In this case, the target QCL information of the cross carrier scheduled PDSCH needs to be determined based on whether the N-bit TCI field is included in the DCI, that is, whether the CORESET corresponding to the PDCCH carrying the DCI is configured with the higher layer parameter tci-PresentIn-DCI, and whether the target higher layer parameter tci-PresentInDCI is set as enabled or disabled.

a. When the time offset between the sending moment at which the network-side device sends the DCI and the sending moment at which the network-side device sends the cross carrier scheduled PDSCH is greater than or equal to the preset threshold, and when the CORESET corresponding to the PDCCH carrying the DCI is not configured with the target higher layer parameter tci-PresentInDCI, it indicates that an N-bit TCI field is not included in the DCI or the N-bit TCI field is included in the DCI but is invalid, and the target QCL information cannot be determined based on the TCI state information in the DCI. In this case, the network-side device determines the target QCL information of the cross carrier scheduled PDSCH based on the predetermined second target TCI state information.

It should be noted that the CORESET corresponding to the PDCCH carrying the DCI being not configured with the target higher layer parameter tci-PresentInDCI includes two cases: (I) The CORESET corresponding to the PDCCH carrying the DCI is not configured with the target higher layer parameter tci-PresentInDCI. For example, the network-side device sends DCI format 1_0 to the terminal device, and an N-bit TCI field is not included in the DCI format 1_0; or the terminal device receives DCI format 1_1, and an N-bit TCI field is not included in the DCI format 1_1. (II) The CORESET corresponding to the PDCCH carrying the DCI is configured with the target higher layer parameter tci-PresentInDCI, but the target higher layer parameter tci-PresentInDCI is set as disabled. For example, the network-side device sends DCI format 1_1 to the terminal device, an N-bit TCI field is included in the DCI format 1_1, but the target higher layer parameter tci-PresentInDCI configured for the CORESET corresponding to the PDCCH carrying the DCI is set as disabled.

For example, when the time offset between the sending moment at which the network-side device sends the DCI and the sending moment at which the network-side device sends the cross carrier scheduled PDSCH is greater than or equal to the preset threshold, and the CORESET corresponding to the PDCCH carrying the DCI is not configured with the target higher layer parameter tci-PresentInDCI (for example, the network-side device sends DCI format 1_0 to the terminal device, and an N-bit TCI field is not included in the DCI format 1_0; or the terminal device receives DCI format 1_1, and an N-bit TCI field is not included in the DCI format 1_1), the network-side device determines the target QCL information of the cross carrier scheduled PDSCH based on TCI state information of the CORESET corresponding to the PDCCH carrying the DCI; or when the time offset between the sending moment at which the network-side device sends the DCI and the sending moment at which the network-side device sends the cross carrier scheduled PDSCH is greater than or equal to the preset threshold, and the CORESET corresponding to the PDCCH carrying the DCI is configured with the target higher layer parameter tci-PresentInDCI (for example, the network-side device sends DCI format 1_1 to the terminal device, and an N-bit TCI field is included in the DCI format 1_1), but the target higher layer parameter tci-PresentInDCI is set as disabled, the network-side device determines the target QCL information of the cross carrier scheduled PDSCH based on TCI state information of the CORESET corresponding to the PDCCH carrying the DCI.

b. When the time offset between the sending moment at which the network-side device sends the DCI and the sending moment at which the network-side device sends the cross carrier scheduled PDSCH is greater than or equal to the preset threshold, the CORESET corresponding to the PDCCH carrying the DCI is configured with the target higher layer parameter tci-PresentInDCI, and the target higher layer parameter tci-PresentInDCI is set as enabled, it indicates that an N-bit TCI field is included in the DCI, and the included N-bit TCI field is valid. In this case, the network-side device determines the target QCL information of the cross carrier scheduled PDSCH based on the TCI state information in the DCI.

According to the foregoing manner 3 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

Manner 4:

In this embodiment of this disclosure, the method further includes:

sending higher layer signaling, where the higher layer signaling is used to configure or indicate the target QCL information to a terminal device.

The higher layer signaling includes at least one of the following:

RRC signaling and MAC CE signaling.

The target QCL information of the cross carrier scheduled PDSCH is determined based on content pre-configured by the network-side device, or predetermined by the network-side device and the terminal device.

For the target QCL information pre-configured by the network-side device, the network-side device indicates the target QCL information to the terminal device through higher layer signaling.

It should be noted that, in addition to the RRC signaling or MAC CE signaling, the higher layer signaling may be other higher layer signaling, which is not specifically limited herein.

The content pre-configured by the network-side device, or predetermined by the network-side device and the terminal device may be: QCL information of a particular carrier (serving cell), a particular BWP, a particular channel, or an RS.

That is, after receiving the higher layer signaling, the terminal device may determine, based on the configuration information carried by the higher layer signaling, that the pre-configured or predetermined particular carrier (serving cell), particular BWP, particular channel or RS is at least in spatial quasi-colocation with the cross carrier scheduled PDSCH.

According to the foregoing manner 4 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

Manner 5:

In this embodiment of this disclosure, determining target QCL information of the cross carrier scheduled PDSCH includes:

if a PDCCH carrying the DCI is in a first frequency band, determining the target QCL information based on pre-determined first target TCI state information, where the first frequency band is a frequency band below 6 GHz; and if the PDCCH carrying the DCI is in a second frequency band, determining the target QCL information based on predetermined second target TCI state information, where the second frequency band is a frequency band above 6 GHz; and the first target TCI state information and the second target TCI state information are different target TCI state information.

The network-side device may distinguish, based on whether the PDCCH carrying the DCI is in the first frequency band (a frequency band below 6 GHz) or in the second frequency band (a frequency band above 6 GHz), different manners of determining the target QCL information of the cross carrier scheduled PDSCH.

(1) When the PDCCH carrying the DCI is in the first frequency band, no matter whether a time offset between a receiving moment at which the terminal device receives the DCI and a receiving moment at which the terminal device receives the cross carrier scheduled PDSCH is less than a preset threshold, the terminal device determines the target QCL information of the cross carrier scheduled PDSCH based on the first target TCI state information (for example, TCI state information of a CORESET with a lowest ID on a BWP in an activated state in a serving cell corresponding to the terminal device).

(2) When the PDCCH carrying the DCI is in the second frequency band, the target QCL information can be determined based on the predetermined second target TCI state information in at least the following three manners:

a. When the PDCCH carrying the DCI is in the second frequency band, and a time offset between a sending moment at which the network-side device sends the DCI and a sending moment at which the network-side device sends the cross carrier scheduled PDSCH is less than a preset threshold, the network-side device determines the target QCL information of the cross carrier scheduled PDSCH based on the second target TCI state information (for example, the TCI state information of the CORESET with the lowest ID on the BWP in the activated state in the serving cell corresponding to the terminal device); or when the PDCCH carrying the DCI is in the second frequency band, and the time offset between the sending moment at which the network-side device sends the DCI and the sending moment at which the network-side device sends the cross carrier scheduled PDSCH is greater than or equal to the preset threshold, the network-side device determines the target QCL information of the cross carrier scheduled PDSCH based on the second target TCI state information (for example, the TCI state information of the CORESET corresponding to the PDCCH carrying the DCI); or when the PDCCH carrying the DCI is in the second frequency band, and the time offset between the receiving moment at which the terminal device receives the DCI and the receiving moment at which the terminal device receives the cross carrier scheduled PDSCH is greater than or equal to the preset threshold, the terminal device determines the target QCL information of the cross carrier scheduled PDSCH based on the second target TCI state information (for example, the TCI state information in the DCI).

b. When the PDCCH carrying the DCI is in the second frequency band, no matter whether the time offset between the sending moment at which the network-side device sends the DCI and the sending moment at which the network-side device sends the cross carrier scheduled PDSCH is less than the preset threshold, the network-side device determines the target QCL information of the cross carrier scheduled PDSCH based on the second target TCI state information (for example, the TCI state information of the CORESET corresponding to the PDCCH carrying the DCI).

According to the foregoing manner 5 of determining the target QCL information of the cross carrier scheduled PDSCH, during cross carrier scheduling of the PDSCH, the network-side device and the terminal device have consistent understanding on the target QCL information of the cross carrier scheduled PDSCH, ensuring the accuracy of data transmission during cross carrier scheduling of the PDSCH.

In the technical solutions recorded in the embodiments of this disclosure, a network-side device sends DCI used to indicate cross carrier scheduling a PDSCH, determines target QCL information of the cross carrier scheduled PDSCH, and then sends the cross carrier scheduled PDSCH based on the target QCL information, so that cross carrier scheduling the PDSCH can be effectively implemented.

Figure 4:
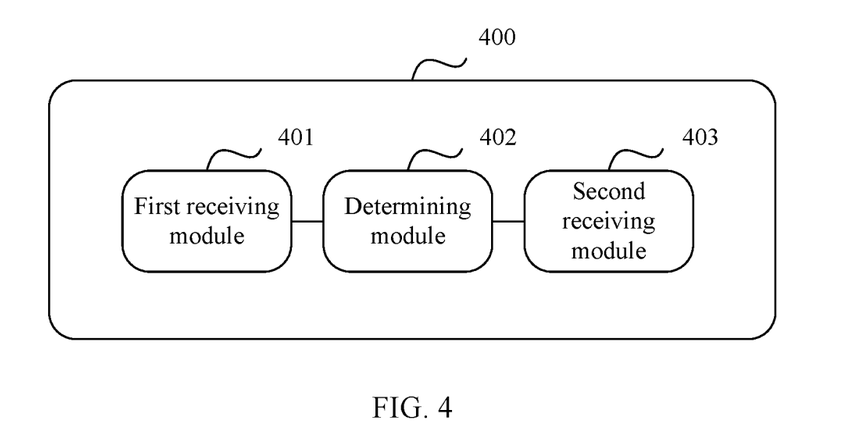
FIG. 4 is a schematic structural diagram of a terminal device according to an embodiment of this disclosure.

FIG. 4 is a schematic structural diagram of a terminal device according to an embodiment of this disclosure. The terminal device 400 shown in FIG. 4 includes:
  a first receiving module 401, configured to receive DCI, where the DCI is used to indicate cross carrier scheduling a PDSCH;
  a determining module 402, configured to determine target QCL information of the cross carrier scheduled PDSCH; and
  a second receiving module 403, configured to receive the cross carrier scheduled PDSCH based on the target QCL information.

It should be noted that, the first receiving module 401 and the second receiving module 403 may be a same hardware receiving module having a receiving function, or may be different software receiving modules having receiving functions, which is not specifically limited herein.

Optionally, the target QCL information includes at least a spatial receiving parameter QCL-TypeD.

Optionally, a CORESET corresponding to a PDCCH carrying the DCI is configured with a target higher layer parameter tci-PresentInDCI, and the target higher layer parameter tci-PresentInDCI is set as enabled.

Optionally, determining module 402 is further configured to:
  determine a time offset between a receiving moment of the DCI and a receiving moment of the cross carrier scheduled PDSCH;
  if the time offset is less than a preset threshold, determine the target QCL information based on predetermined target TCI state information; and
  if the time offset is greater than or equal to the preset threshold, determine the target QCL information based on TCI state information in the DCI.

Optionally, determining module 402 is further configured to:
  determine the target QCL information based on predetermined target TCI state information.

Optionally, determining module 402 is further configured to:
  determine a time offset between a receiving moment of the DCI and a receiving moment of the cross carrier scheduled PDSCH;
  if the time offset is less than a preset threshold, determine the target QCL information based on predetermined first target TCI state information;
  if the time offset is greater than or equal to the preset threshold, and a CORESET corresponding to a PDCCH carrying the DCI is not configured with a target higher layer parameter tci-PresentInDCI, determine the target QCL information based on predetermined second target TCI state information; and
  if the time offset is greater than or equal to the preset threshold, the CORESET corresponding to the PDCCH carrying the DCI is configured with the target higher layer parameter tci-PresentInDCI, and the target higher layer parameter tci-PresentInDCI is set as enabled, determine the target QCL information based on TCI state information in the DCI; where
  the first target TCI state information and the second target TCI state information are same or different target TCI state information.

Optionally, the terminal device 400 further includes:
  a receiving module, configured to receive higher layer signaling, where the higher layer signaling is used to configure or indicate the target QCL information.

Optionally, the higher layer signaling includes at least one of the following:
  RRC signaling and MAC CE signaling.

Optionally, determining module 402 is further configured to:
  if a PDCCH carrying the DCI is in a first frequency band, determine the target QCL information based on predetermined first target TCI state information, where the first frequency band is a frequency band below 6 GHz; and
  if the PDCCH carrying the DCI is in a second frequency band, determine the target QCL information based on predetermined second target TCI state information, where the second frequency band is a frequency band above 6 GHz; and
  the first target TCI state information and the second target TCI state information are different target TCI state information.

Optionally, the target TCI state information includes at least one of the following:
  TCI state information of a CORESET with a target ID on a BWP in an activated state in a serving cell corresponding to the terminal device 400; and
  TCI state information of a CORESET corresponding to a PDCCH carrying the DCI.

Optionally, the CORESET with the target ID on the BWP is a CORESET with a lowest ID on the BWP.

The terminal device 400 provided by this embodiment of this disclosure can implement each process implemented by the terminal device in the method embodiment in FIG. 2. Details are not described herein again to avoid repetition.

Figure 5:
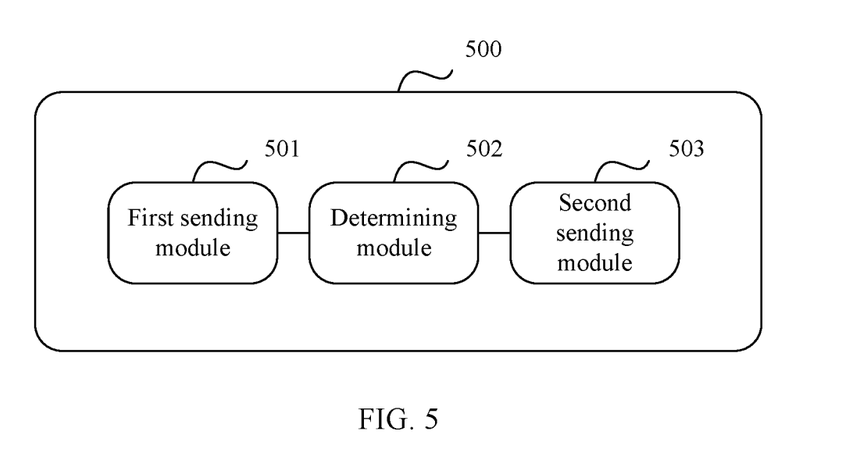
FIG. 5 is a schematic structural diagram of a network-side device according to an embodiment of this disclosure.

FIG. 5 is a schematic structural diagram of a network-side device according to an embodiment of this disclosure. The network-side device 500 shown in FIG. 5 includes:
  a first sending module 501, configured to send DCI, where the DCI is used to indicate cross carrier scheduling a PDSCH;
  a determining module 502, configured to determine target QCL information of the cross carrier scheduled PDSCH; and
  a second sending module 503, configured to send the cross carrier scheduled PDSCH based on the target QCL information.

It should be noted that, the first sending module 501 and the second sending module 503 may be a same hardware sending module having a sending function, or may be different software sending modules having sending functions, which is not specifically limited herein.

Optionally, the target QCL information includes at least a spatial receiving parameter QCL-TypeD.

Optionally, a CORESET corresponding to a PDCCH carrying the DCI is configured with a target higher layer parameter tci-PresentInDCI, and the target higher layer parameter tci-PresentInDCI is set as enabled.

Optionally, determining module 502 is further configured to:
- determine a time offset between a sending moment of the DCI and a sending moment of the cross carrier scheduled PDSCH;
- if the time offset is less than a preset threshold, determine the target QCL information based on predetermined target TCI state information; and
- if the time offset is greater than or equal to the preset threshold, determine the target QCL information based on TCI state information in the DCI.

Optionally, determining module 502 is further configured to:
- determine the target QCL information based on predetermined target TCI state information.

Optionally, determining module 502 is further configured to:
- determine a time offset between a sending moment of the DCI and a sending moment of the cross carrier scheduled PDSCH;
- if the time offset is less than a preset threshold, determine the target QCL information based on predetermined first target TCI state information;
- if the time offset is greater than or equal to the preset threshold, and a CORESET corresponding to a PDCCH carrying the DCI is not configured with a target higher layer parameter tci-PresentInDCI, determine the target QCL information based on predetermined second target TCI state information; and
- if the time offset is greater than or equal to the preset threshold, the CORESET corresponding to the PDCCH carrying the DCI is configured with the target higher layer parameter tci-PresentInDCI, and the target higher layer parameter tci-PresentInDCI is set as enabled, determine the target QCL information based on TCI state information in the DCI; where
- the first target TCI state information and the second target TCI state information are same or different target TCI state information.

Optionally, the network-side device 500 further includes:
- a third sending module, configured to send higher layer signaling, where the higher layer signaling is used to configure or indicate the target QCL information to a terminal device.

Optionally, the higher layer signaling includes at least one of the following:
- RRC signaling and MAC CE signaling.

Optionally, determining module 502 is further configured to:
- if a PDCCH carrying the DCI is in a first frequency band, determine the target QCL information based on predetermined first target TCI state information, where the first frequency band is a frequency band below 6 GHz; and
- if the PDCCH carrying the DCI is in a second frequency band, determine the target QCL information based on predetermined second target TCI state information, where the second frequency band is a frequency band above 6 GHz; and
- the first target TCI state information and the second target TCI state information are different target TCI state information.

Optionally, the target TCI state information includes at least one of the following:
- TCI state information of a CORESET with a target ID on a BWP in an activated state in a serving cell corresponding to the terminal device; and
- TCI state information of a CORESET corresponding to a PDCCH carrying the DCI.

Optionally, the CORESET with the target ID on the BWP is a CORESET with a lowest ID on the BWP.

The network-side device 500 provided in this embodiment of this disclosure can implement each process implemented by the network-side device in the method embodiment in FIG. 3. Details are not described herein again to avoid repetition.

Figure 6:
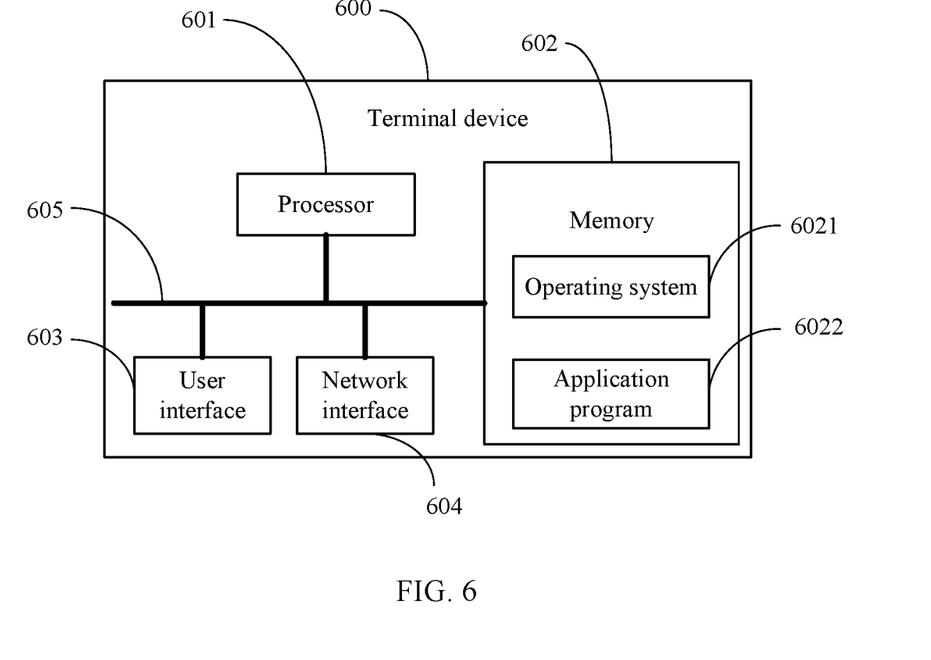
FIG. 6 is another schematic structural diagram of a terminal device according to an embodiment of this disclosure.

FIG. 6 is another schematic structural diagram of a terminal device according to an embodiment of this disclosure. The terminal device 600 shown in FIG. 6 includes at least one processor 601, a memory 602, at least one network interface 604, and a user interface 603. The components in the terminal device 600 are coupled together through a bus system 605. It may be understood that the bus system 605 is configured to implement connection and communication between these components. In addition to a data bus, the bus system 605 further includes a power bus, a control bus, and a status signal bus. However, for clarity of description, various buses are marked as the bus system 605 in FIG. 6.

The user interface 603 may include a display, a keyboard, or a pointing device (for example, a mouse, a trackball (trackball), a touch panel, or a touchscreen).

It can be understood that the memory 602 in this embodiment of this disclosure may be a volatile memory or a non-volatile memory, or may include both a volatile memory and a non-volatile memory. The non-volatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. By way of example but not restrictive description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synch link DRAM, SLDRAM), and a direct rambus random access memory (Direct Rambus RAM, DRRAM). The memory 602 of the system and the method described in the embodiments of this disclosure is intended to include but not be limited to these and any other applicable types of memories.

In some embodiments, the memory 602 stores the following elements: executable modules or data structures, or a subset thereof, or an extended set thereof: an operating system 6021 and an application program 6022.

The operating system 6021 includes various system programs, such as a framework layer, a core library layer, and a driver layer, for implementing various basic services and processing hardware-based tasks. The application program 6022 includes various application programs, such as a media player (Media Player) and a browser (Browser), which are used to implement various application services. A program for implementing the method in the embodiments of this disclosure may be included in the application program 6022.

In this embodiment of this disclosure, the terminal device 600 further includes a computer program stored in the memory 602 and capable of running on the processor 601. When being executed by the processor 601, the computer program implements the following steps:

receiving DCI, where the DCI is used to indicate cross carrier scheduling a PDSCH; determining target QCL information of the cross carrier scheduled PDSCH; and receiving the cross carrier scheduled PDSCH based on the target QCL information.

The method disclosed in the foregoing embodiments of this disclosure may be applied to the processor 601 or implemented by the processor 601. The processor 601 may be an integrated circuit chip, having a signal processing capability. During implementation, the steps of the foregoing method can be completed by hardware integrated logic circuits in the processor 601 or instructions in the form of software. The processor 601 may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor can implement or execute the methods, steps, and logical block diagrams disclosed in the embodiments of this disclosure. The general-purpose processor may be a microprocessor, or the processor may be any conventional processor or the like. The steps of the method disclosed with reference to the embodiments of this disclosure may be directly executed and completed by a hardware decoding processor, or executed and completed by a combination of hardware and software modules in a decoding processor. The software module may be located in a computer-readable storage medium mature in the art, such as a random access memory, a flash memory, a read-only memory, a programmable read-only memory or electrically erasable programmable memory, or a register. The computer-readable storage medium is located in the memory 602, and the processor 601 fetches information in the memory 602, and completes the steps of the foregoing method in combination with its hardware. Specifically, the computer-readable storage medium stores a computer program, where when the computer program is executed by the processor 601, the steps in the method embodiment in FIG. 2 are implemented.

It can be understood that the embodiments described in the embodiments of this disclosure may be implemented by hardware, software, firmware, middleware, microcode, or a combination thereof. For hardware implementation, the processing unit may be implemented in one or more application-specific integrated circuits (Application Specific Integrated Circuit, ASIC), digital signal processors (Digital Signal Processor, DSP), digital signal processing devices (DSP Device, DSPD), programmable logic devices (Programmable Logic Device, PLD), field-programmable gate arrays (Field-Programmable Gate Array, FPGA), general-purpose processors, controllers, microcontrollers, microprocessors, and other electronic units for performing the functions described in this disclosure, or a combination thereof.

For software implementation, the techniques described in the embodiments of this disclosure may be implemented by modules (for example, procedures or functions) that perform the functions described in the embodiments of this disclosure. Software code may be stored in the memory and executed by the processor. The memory may be implemented inside the processor or outside the processor.

The terminal device 600 can implement each process implemented by the terminal device in the foregoing method embodiment in FIG. 2. Details are not described herein again to avoid repetition.

An embodiment of this disclosure further provides a computer-readable storage medium, where the computer-readable storage medium stores a computer program, and when the computer program is executed by a processor, each process of the foregoing method embodiment in FIG. 2 is implemented, and a same technical effect can be achieved. Therefore, details are not described herein again to avoid repetition. The computer-readable storage medium is, for example, a read-only memory (Read-Only Memory, ROM), a random access memory (Random Access Memory, RAM), a magnetic disk, or an optical disc.

Figure 7:
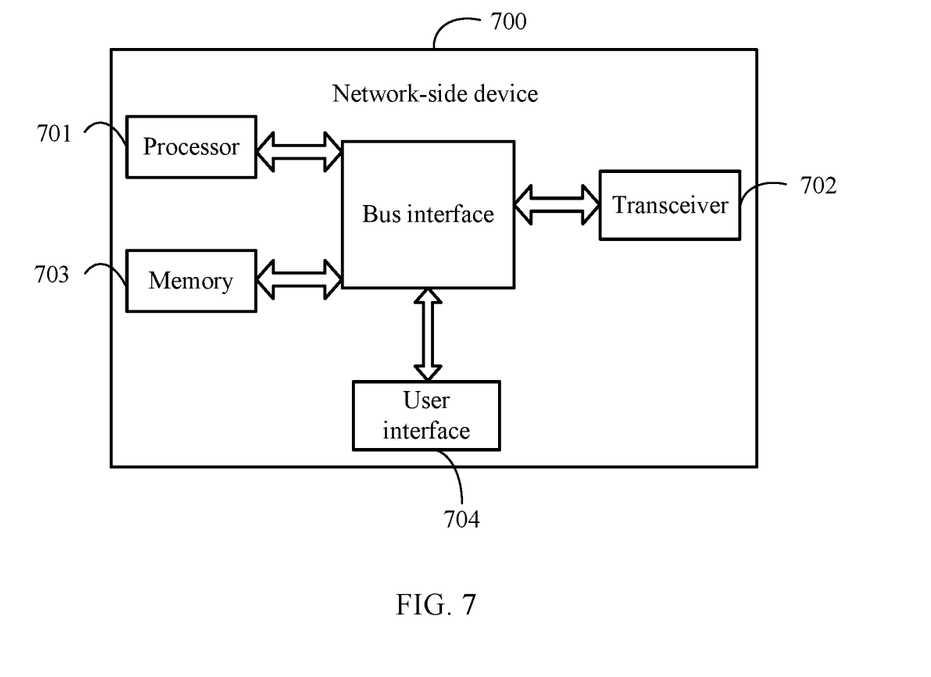
FIG. 7 is another schematic structural diagram of a network-side device according to an embodiment of this disclosure.

FIG. 7 is another schematic structural diagram of a network-side device according to an embodiment of this disclosure. The network-side device 700 shown in FIG. 7 can implement details of the method embodiment in FIG. 3, and achieve a same effect. As shown in FIG. 7, the network-side device 700 includes a processor 701, a transceiver 702, a memory 703, a user interface 704, and a bus interface.

In this embodiment of this disclosure, the network-side device 700 further includes a computer program stored in the memory 703 and capable of running on the processor 701, where when the computer program is executed by the processor 701, the following steps are implemented:

sending DCI, where the DCI is used to indicate cross carrier scheduling a PDSCH; determining target QCL information of the cross carrier scheduled PDSCH; and sending the cross carrier scheduled PDSCH based on the target QCL information.

In FIG. 7, a bus architecture may include any quantity of interconnected buses and bridges, and specifically connect together various circuits of one or more processors represented by the processor 701 and a memory represented by the memory 703. The bus architecture may further interconnect various other circuits such as a peripheral device, a voltage regulator, and a power management circuit. These are all well known in the art, and therefore are not further described in this specification. The bus interface provides interfaces. The transceiver 702 may be a plurality of elements, including a transmitter and a receiver, and provides units configured to perform communication with various other apparatuses over a transmission medium. For different user equipment, the user interface 704 may also be an interface for externally or internally connecting a required device, and the connected device includes but is not limited to a mini keyboard, a display, a speaker, a microphone, a joystick, or the like.

The processor 701 is responsible for management of the bus architecture and general processing, and the memory 703 may store data used by the processor 701 when the processor 701 performs an operation.

The network-side device 700 can implement each process implemented by the network-side device in the foregoing method embodiment in FIG. 3. Details are not described herein again to avoid repetition.

An embodiment of this disclosure further provides a computer-readable storage medium, where the computer-readable storage medium stores a computer program, and when the computer program is executed by a processor, each process of the foregoing method embodiment in FIG. 3 is implemented, and a same technical effect can be achieved. Therefore, details are not described herein again to avoid repetition. The computer-readable storage medium is, for example, a read-only memory (Read-Only Memory, ROM), a random access memory (Random Access Memory, RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . ." does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. Based on such an understanding, the technical solutions of this disclosure essentially, or the part contributing to the related art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A method for cross carrier scheduling a physical downlink shared channel, performed by a terminal device, comprising:
   receiving downlink control information (DCI), wherein the DCI is used to indicate cross carrier scheduling a physical downlink shared channel (PDSCH);
   determining target quasi-colocation (QCL) information of the cross carrier scheduled PDSCH; and
   receiving the cross carrier scheduled PDSCH based on the target QCL information,
   wherein determining the target QCL information of the cross carrier scheduled PDSCH comprises:
      determining a time offset between a receiving moment of the DCI and a receiving moment of the cross carrier scheduled PDSCH;
      when the time offset is less than a preset threshold, determining the target QCL information based on predetermined first target TCI state information;
      when the time offset is greater than or equal to the preset threshold, and a control resource set (CORESET) corresponding to a physical downlink control channel (PDCCH) carrying the DCI is not configured with a target higher layer parameter tci-PresentIn-DCI, determining the target QCL information based on predetermined second target TCI state information; and
      when the time offset is greater than or equal to the preset threshold, the CORESET corresponding to the PDCCH carrying the DCI is configured with the target higher layer parameter tci-PresentInDCI, and the target higher layer parameter tci-PresentInDCI is set as enabled, determining the target QCL information based on TCI state information in the DCI,
   wherein the first target TCI state information and the second target TCI state information are same or different target TCI state information.

2. The method according to claim 1, wherein the target QCL information comprises at least a spatial receiving parameter QCL-TypeD.

3. The method according to claim 1, wherein determining the target QCL information of the cross carrier scheduled PDSCH further comprises:
   when the time offset is less than a preset threshold, determining the target QCL information based on predetermined target transmission configuration indication TCI state information; and
   when the time offset is greater than or equal to the preset threshold, determining the target QCL information based on TCI state information in the DCI.

4. A non-transitory computer-readable storage medium storing a computer program thereon, wherein the computer program, when executed by a processor, causes the processor to implement the method for cross carrier scheduling a physical downlink shared channel according to claim 1.

5. A terminal device, comprising a memory, a processor, and a computer program stored in the memory and capable of running on the processor, wherein the computer program, when executed by the processor, causes the processor to:
   receive DCI, wherein the DCI is used to indicate cross carrier scheduling a PDSCH;
   determine target QCL information of the cross carrier scheduled PDSCH; and
   receive the cross carrier scheduled PDSCH based on the target QCL information,
   wherein, to determine the target QCL information of the cross carrier scheduled PDSCH, the computer program further causes the processor to:
      determine a time offset between a receiving moment of the DCI and a receiving moment of the cross carrier scheduled PDSCH;
      when the time offset is less than a preset threshold, determine the target QCL information based on predetermined first target TCI state information;
      when the time offset is greater than or equal to the preset threshold, and a control resource set (CORESET) corresponding to a physical downlink control channel (PDCCH) carrying the DCI is not configured with a target higher layer parameter tci-PresentIn-DCI, determine the target QCL information based on predetermined second target TCI state information; and
      when the time offset is greater than or equal to the preset threshold, the CORESET corresponding to the PDCCH carrying the DCI is configured with the target higher layer parameter tci-PresentInDCI, and the target higher layer parameter tci-PresentInDCI is set as enabled, determine the target QCL information based on TCI state information in the DCI,
   wherein the first target TCI state information and the second target TCI state information are same or different target TCI state information.

6. The terminal device according to claim 5, wherein the target QCL information comprises at least a spatial receiving parameter QCL-TypeD.

7. The terminal device according to claim 5, wherein, to determine the target QCL information of the cross carrier scheduled PDSCH, the computer program further causes the processor to:
 when the time offset is less than a preset threshold, determine the target QCL information based on predetermined target transmission configuration indication TCI state information; and
 when the time offset is greater than or equal to the preset threshold, determine the target QCL information based on TCI state information in the DCI.

8. The terminal device according to claim 7, wherein the target TCI state information comprises at least one of the following:
 TCI state information of a CORESET with a target identifier ID on a bandwidth part BWP in an active state in a serving cell corresponding to the terminal device; and
 TCI state information of a CORESET corresponding to a PDCCH carrying the DCI.

9. The terminal device according to claim 8, wherein the CORESET with the target ID on the BWP is a CORESET with a lowest ID on the BWP.

10. The terminal device according to claim 5, wherein, to determine the target QCL information of the cross carrier scheduled PDSCH, the computer program further causes the processor to:
 receive higher layer signaling, wherein the higher layer signaling is used to configure or indicate the target QCL information.

11. The terminal device according to claim 10, wherein the higher layer signaling comprises at least one of the following:
 radio resource control (RRC) signaling and media access control element (MAC CE) signaling.

12. A network-side device, comprising a memory, a processor, and a computer program stored in the memory and capable of running on the processor, wherein the computer program, when executed by the processor, causes the processor to:
 send DCI, wherein the DCI is used to indicate cross carrier scheduling a PDSCH;
 determine target QCL information of the cross carrier scheduled PDSCH; and
 send the cross carrier scheduled PDSCH based on the target QCL information,
 wherein, to determine the target QCL information of the cross carrier scheduled PDSCH, the computer program further causes the processor to:
  determine a time offset between a receiving moment of the DCI and a receiving moment of the cross carrier scheduled PDSCH;
  when the time offset is less than a preset threshold, determine the target QCL information based on predetermined first target TCI state information;
  when the time offset is greater than or equal to the preset threshold, and a control resource set (CORESET) corresponding to a physical downlink control channel (PDCCH) carrying the DCI is not configured with a target higher layer parameter tci-PresentInDCI, determine the target QCL information based on predetermined second target TCI state information; and
  when the time offset is greater than or equal to the preset threshold, the CORESET corresponding to the PDCCH carrying the DCI is configured with the target higher layer parameter tci-PresentInDCI, and the target higher layer parameter tci-PresentInDCI is set as enabled, determine the target QCL information based on TCI state information in the DCI,
  wherein the first target TCI state information and the second target TCI state information are same or different target TCI state information.

13. The network-side device according to claim 12, wherein the target QCL information comprises at least a spatial receiving parameter QCL-TypeD.

14. The network-side device according to claim 12, wherein, to determine the target QCL information of the cross carrier scheduled PDSCH, the computer program further causes the processor to:
 when the time offset is less than a preset threshold, determine the target QCL information based on predetermined target TCI state information; and
 when the time offset is greater than or equal to the preset threshold, determine the target QCL information based on TCI state information in the DCI.

* * * * *